United States Patent
Johns et al.

(10) Patent No.: US 10,609,067 B2
(45) Date of Patent: *Mar. 31, 2020

(54) ATTACK PROTECTION FOR WEBRTC PROVIDERS

(71) Applicant: SAP SE, Walldorf (DE)

(72) Inventors: Martin Johns, Karlsruhe (DE); Christoph Haefner, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,083

(22) Filed: Apr. 16, 2019

(65) Prior Publication Data

US 2019/0245886 A1    Aug. 8, 2019

Related U.S. Application Data (63) Continuation of application No. 15/373,883, filed on Dec. 9, 2016, now Pat. No. 10,320,832.

(51) Int. Cl.
*H04L 29/06* (2006.01)
*H04N 5/225* (2006.01)

(52) U.S. Cl.
CPC .......... *H04L 63/1441* (2013.01); *H04L 63/08* (2013.01); *H04L 63/1416* (2013.01); *H04L 63/1466* (2013.01); *H04L 65/608* (2013.01); *H04N 5/225* (2013.01)

(58) Field of Classification Search
CPC ............ H04L 63/1441; H04L 63/1466; H04L 65/608; H04L 63/08; H04L 63/1416; H04L 67/2804; H04L 67/141; H04L 65/1069; H04N 5/225; H04N 7/141
USPC ........................................................... 726/4
See application file for complete search history.

(56) References Cited

U.S. PATENT DOCUMENTS

| | | | |
|---|---|---|---|
| 8,578,482 B1* | 11/2013 | Yang | G06F 21/51 726/22 |
| 10,320,832 B2* | 6/2019 | Johns | H04L 63/1466 |
| 2014/0347754 A1 | 11/2014 | Lee | |
| 2016/0014091 A1 | 1/2016 | Hiltch | |
| 2016/0088015 A1* | 3/2016 | Sivan | G06F 16/986 726/23 |
| 2018/0167410 A1 | 6/2018 | Johns et al. | |

OTHER PUBLICATIONS

"U.S. Appl. No. 15/373,383, Response filed Jan. 15, 2019 to Non Final Office Action dated Oct. 19, 2018", 14 pgs.
"U.S. Appl. No. 15/373,883, Non Final Office Action dated Oct. 19, 2018", 9 pgs.

(Continued)

*Primary Examiner* — Kambiz Zand
*Assistant Examiner* — Aubrey H Wyszynski
(74) *Attorney, Agent, or Firm* — Schwegman Lundberg & Woessner, P.A.

(57) ABSTRACT

WebRTC is vulnerable to malicious JavaScript, injected by cross-site scripting attacks or compromised or malicious script providers. Through these attacks, attackers can access a WebRTC connection and leak or monitor the audio and video data transmitted. By preventing modification of key WebRTC functions and preventing outgoing streams from being used more than once, these attacks can be thwarted.

20 Claims, 8 Drawing Sheets (56) References Cited

OTHER PUBLICATIONS

"U.S. Appl. No. 15/373,883, Notice of Allowance dated Mar. 29, 2019", 7 pgs.
"Cookieless Monster: Exploring the Ecosystem of Web-based Device Fngerprinting", Proceedings of the 2013 IEEE Symposium on Security and Privacy, (2013), 541-555.
"European Application Serial No. 17001470.8, Search Report dated Feb. 16, 2018", 5 pgs.
"Object Freeze", Mozilla Developer Network, [Online]. Retrieved from the Internet: <URL: ttps://developer.mozilla.org/en/docs/Web/JavaScript/Reference/Global Objects/Object/freeze>, (Jul. 2015), 8 pgs.
Alvestrand, H, "Overview: Real Time Protocols for Browser-based Applications", Internet Engineering Task Force. Copyright (c) 2014 IETF Trust and the persons identified as the document authors. All rights reserved., [Online]. Retrieved from the Internet: <URL: http://tools.ietf.org/html/draft-ietf-rtcweb-overview-13>. (Nov. 28, 2014), 1-22.
Antaki, C, "Disable WebRTC", [Online]. Retrieved from the Internet: <URL: https://addons.mozilla.org/en-US/?refox/addon/happy-bonobo-disable-webrtc/>, (2015), 3 pgs.
Barnes, Richard, et al., "Browser-to-Browser Security Assurances for WebRTC", Internet Computing, IEEE, vol. 18, No. 6., (Nov. 2014), 11-17.
Barth, Adam, et al., "Robust defenses for cross-site request forgery", CCS, (2008), 75-88.
Beltran, Victoria, et al., "User Identity for WebRTC Services: A matter of Trust", Internet Computing, IEEE, vol. 18, No. 6, [Online]. Retrieved from the Internet: <URL:, (Nov. 2014), 18-25.
Bergkvist, Adam, et al., "WebRTC 1.0: Real-time Communication Between Browsers (W3C Working Draft Aug. 21, 2012)", © 2011-2012 W3C® (MIT, ERCIM, Keio), All Rights Reserved., [Online]. Retrieved from the Internet: <URL: https://www.w3.org/TR/2012/WD-webrtc-20120821/>, (2012), 1-25.
Bergkvist, Adam, et al., "WebRTC: 1.0: Real-time Communication Between Browsers (W3C Editor's Draft Mar. 6, 2015)", © 2011-2015 W3C® (MIT, ERCIM, Keio, Beihang), All Rights Reserved., [Online]. Retrieved from the Internet: <URL: http://w3c.github.io/webrtc-pc/archives/20150306/webrtc.html>, (Mar. 6, 2015), 1-50.
Heiderich, Mario, et al., "IceShield: Detection and Mitigation of Malicious Websites with a Frozen DOM", RAID, [Online]. Retrieved from the Internet: <URL: http: //dx.doi.org/10.1007/978-3-642-23644-0>, (2011), 281-300.
Heiderich, Mario, "Towards Elimination of XSS Attacks with a Trusted and Capability Controlled DOM", Ph.D. dissertation, [Online]. Retrieved from the Internet: <URL: http://heideri.ch/thesis>, (May 2012), 220 pgs.
Jackson, Collin, et al., "ForceHTTPS: Protecting High-Security Web Sites from Network Attacks", Proceedings of the 17th international conference on World Wide Web., (2008), 525-534.
Johns, Martin, "On JavaScript Malware and Related Threats—Web Page Based Attacks Revisited", Journal in Computer Virology, Springer Paris, vol. 4, No. 3., (Aug. 2008), 161-178.
Johns, Martin, et al., "The Unexpected Dangers of Dy-namic JavaScript," in USENIX Security, SENIX Security, [Online]. Retrieved from the Internet: <URL: https://www.usenix.org/system/files/conference/usenixsecurity15/sec15-paper-lekies.pdf>, (2015), 723-735.
Lekies, Sebastian, et al., "Lightweight Integrity Protection for Web Storage-driven Content Caching", 6th Workshop on Web 2.0 Security and Privacy, (2012), 22 pgs.
Li. L, et al., "Who is Calling Which Page on the Web?", Internet Computing, IEEE, vol. 18, No. 6, (Nov. 2014), 26-33.
Magazinius, Jonas, et al., "Safe Wrappers and Sane Policies for Self Protecting JavaScript", NordSec., LNCS, (2010), 239-255.
Mahy, R, et al., "Traversal Using Relays around NAT (TURN): Relay Extensions to Session Traversal Utilities for NAT (STUN)", Internet Engineering Task Force (IETF), [Online]. Retrieved from the Internet: <URL: http: //www.ietf.org/rfc/rfc5766.txt, (Apr. 2010), 67 pgs.
Mcgrew, D, et al., "Datagram Transport Layer Security (DTLS) Extension to Establish Keys for the Secure Real-time Transport Protocol (SRTP)", Internet Engineering Task Force. RFC 5764, [Online]. Retrieved from the Internet: <URL: https://tools.ietf.org/pdf/rfc5764.pdf>, (2010), 1-26.
Phung, Phu, et al., "Lightweight self-protecting JavaScript", ASIACCS, (Jan. 2009), 47-60.
Rescorla, E, et al., "Datagram Transport Layer Security Version 1.2", RFC 6347 (Proposed Standard), Internet Engineering Task Force. Copyright (c) 2012 IETF Trust and the persons identified as the document authors. All rights reserved., [Online]. Retrieved from the Internet: <URL: http: //www.ietf.org/rfc/rfc6347.txt>, (Jan. 2012), 1-33.
Rescorla, E, "Security Considerations for WebRTC", Internet Engineering Task Force, Internet-Draft, [Online]. Retrieved from the Internet: <URL: https://tools.ietf.org/pdf/draft-ietf-rtcweb-security-08.pdf>, (2015), 1-24.
Rescorla, E., "WebRTC Security Architecture", Internet Engineering Task Force, Internet-Draft draft-ietf-rtcweb-security-arch-11 (work in progress)., [Online]. Retrieved from the Internet: <URL: http://tools/ietf.org/html/draft-ietf-rtcweb-security-arch-11>, (Mar. 7, 2015).
Roesler, D, "STUN IP Address requests for WebRTC", [Online], Retrieved from the Internet: <URL: https://github.com/diafygi/webrtc-ips>, (2015), 3 pgs.
Rosenberg, J, "Interactive Connectivity Establishment (ICE): A Protocol for Network Address Translator (NAT) Traversal for Offer/Answer Protocols", Internet Engineering Task Force (IETF); Request for Comments: 5245, [Online] retrieved from the internet: <https://www.rfceditor.org/rfc/pdfrfc/rfc5245.txt.pdf>, (Apr. 2010), 117 pgs.
Rosenberg, J, et al., "Session Traversal Utilities for NAT (STUN)", RFC 5389 (Proposed Standard), Internet Engineering Task Force. Copyright (C) The IETF Trust. Updated by RFC 7350., [Online]. Retrieved from the Internet: <URL: https://tools.ietf.org/html/rfc5389>, (Oct. 2008), 1-50.
Rosenberg, J., et al., "An Offer/Answer Model With the Session Description Protocol (SDP)", Network Working Group, Request for Comments: 3264, [Online]. Retrieved from the Internet: <URL: http://www.ietf.org/rfc/rfc3264.txt>, (Jun. 2002), 24 pgs.
U.S. Appl. No. 15/373,883, filed Dec. 9, 2016, Attack Protection for WebRTC Providers.

* cited by examiner

ATTACK PROTECTION FOR WEBRTC PROVIDERS

PRIORITY CLAIM

The application is a continuation of U.S. application Ser. No. 15/373,883, entitled "Attack Protection for WebRTC Providers," filed on Dec. 9, 2016 and published as U.S. Patent Application Publication No. 2018/0167410 on Jun. 14, 2018, which application is incorporated herein by reference in its entirety.

TECHNICAL FIELD

The subject matter disclosed herein generally relates to security of data communications. Specifically, the present disclosure addresses systems and methods to transparently and robustly protect from attacks on web real-time communication (WebRTC) providers.

BACKGROUND

WebRTC enables real-time communication over peer-to-peer connections between web browsers. As a result, WebRTC allows for video conferencing and other direct communications in the browser between end users without the need to use either a central server or a browser plugin.

WebRTC uses the datagram transport layer security (DTLS) protocol for secure real-time transport protocol (SRTP) messages between the end points. A web application is provided to end-users by a web server. The web application accesses WebRTC JavaScript APIs from the browser and handles interactions with the user and the exchange of metadata between the end points via a signaling server.

Each browser collects metadata (e.g., a certificate fingerprint for the DTLS connection, a set of local Internet protocol (IP) addresses and public IP/port pairs of the end point, or availability of network relays) about its respective end point. The metadata is exchanged via the signaling server.

After the metadata is exchanged, the end points agree on media characteristics and transport addresses (e.g., IP/port pairs) for communication. The peer-to-peer DTLS-SRTP communication channel is established using the agreed upon setup, and the WebRTC connection begins.

BRIEF DESCRIPTION OF THE DRAWINGS

Some embodiments are illustrated by way of example and not limitation in the figures of the accompanying drawings.

DETAILED DESCRIPTION

Example methods and systems are directed to providing attack protection to WebRTC providers. The attack protection may be implemented in a web browser, a software application, an operating system, or any suitable combination thereof. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

WebRTC communications in web applications are vulnerable to malicious JavaScript, injected by cross-site scripting attacks or compromised or malicious script providers. Through these attacks, attackers can access a WebRTC connection and leak or monitor the audio and video data transmitted. By preventing modification of key WebRTC functions and preventing outgoing and incoming streams from being used more than once, these attacks can be thwarted.

Figure 1:
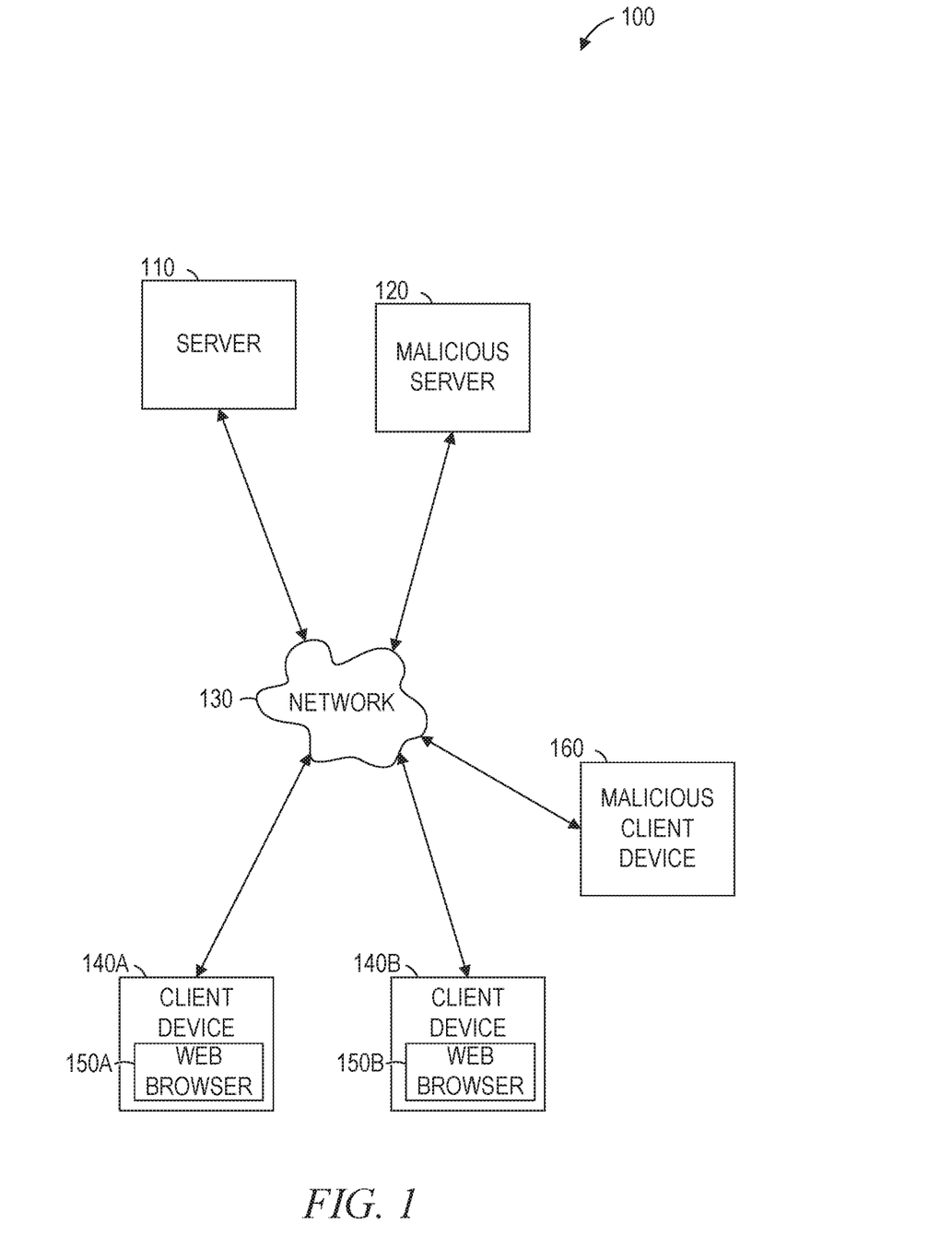
FIG. 1 is a network diagram illustrating a network environment suitable for implementing attack protection for WebRTC providers, according to some example embodiments.

FIG. 1 is a network diagram illustrating a network environment 100 suitable for implementing attack protection for WebRTC providers, according to some example embodiments. The network environment 100 includes a server 110, a malicious server 120, client devices 140A and 140B, a malicious client device 160, and a network 130. The server 110 may host a WebRTC application. The client devices 140A and 140B may receive the WebRTC application from the server 110 and run the WebRTC application in the web browsers 150A and 150B. Using the WebRTC application, the client devices 140A and 140B may transfer information to each other without needing to make further use of the server 110. The malicious server 120 may attempt to inject malicious JavaScript code into the WebRTC application. The malicious client device 160 may intend to receive WebRTC streams from the client device 140A, the client device 140B, or both. The malicious client device 160 may use a web browser or a programmatic interface to process or view the received WebRTC streams. The server 110, the malicious server 120, the client devices 140A and 140B, and the malicious client device 160 may each be implemented in a computer system, in whole or in part, as described below with respect to FIG. 8.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, document-oriented NoSQL databases, a file store, or any suitable combination thereof. The database may be an in-memory database. Moreover, any two or more of the machines, databases, or devices illustrated in FIG. 1 may be combined into a single machine, and the functions described herein for any single machine, database, or device may be subdivided among multiple machines, databases, or devices.

The server 110, the malicious server 120, the client devices 140A and 140B, and the malicious client device 160 may be connected by the network 130. The network 130 may be any network that enables communication between or among machines, databases, and devices. Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof.

Figure 2:
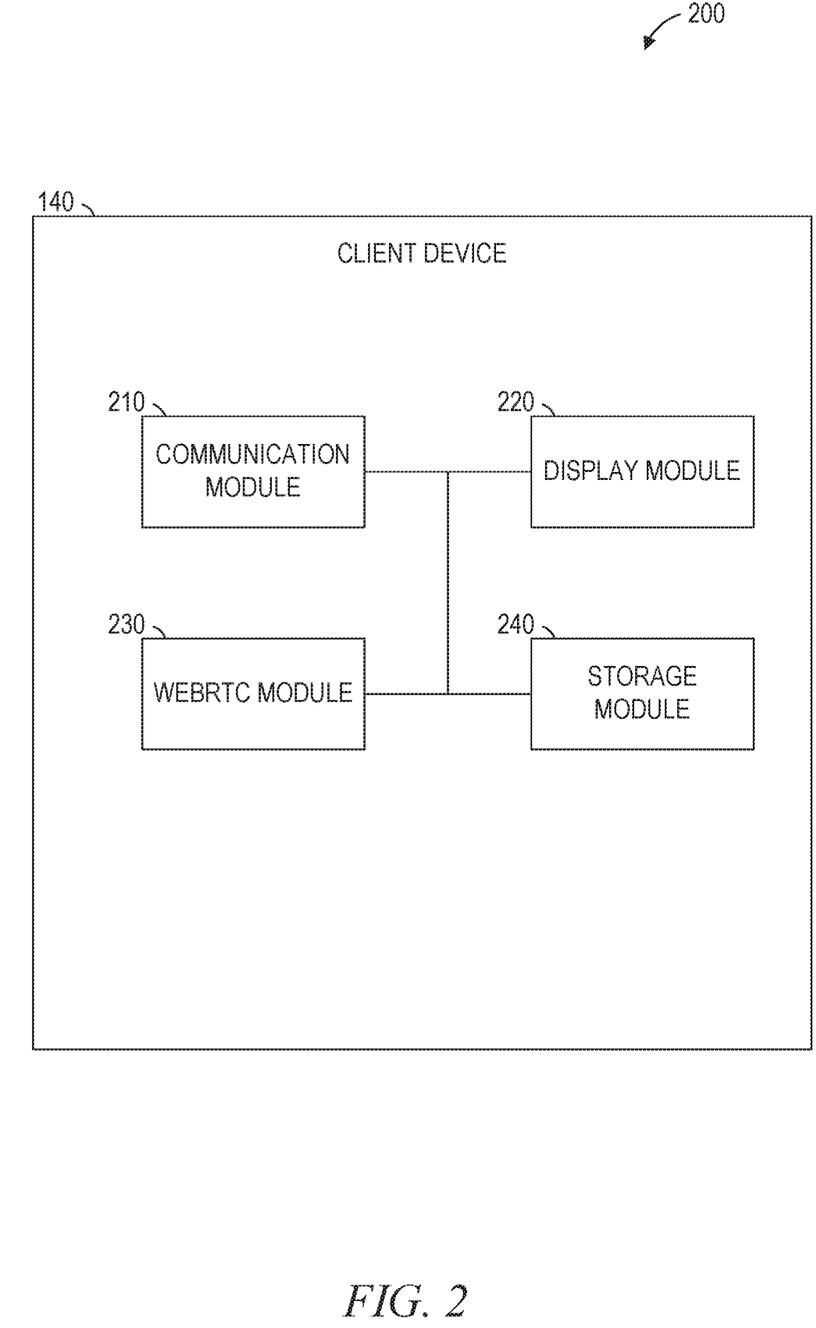
FIG. 2 is a block diagram of a client device, according to some example embodiments, suitable for using WebRTC.

FIG. 2 is a block diagram of a client device 140 (e.g., the client device 140A or 140B), according to some example embodiments, suitable for using WebRTC. The client device 140 is shown as including a communication module 210, a display module 220, a WebRTC module 230, and a storage module 240, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the client device 140 and transmits data from the client device 140. For example, requests for data or code may be sent from the client device 140 to the server 110 to retrieve JavaScript code to implement a WebRTC-based communication channel between two client devices. Once the WebRTC-based communication channel is established, the communication module 210 may send and receive WebRTC data to/from another client device.

The display module 220 accesses a display of the client device 140 for presentation of information to a user. For example, received video data from a WebRTC connection may be sent to the display via the display module 220. As another example, a web browser 150A running on the client device 140 may present a browser window, user interface elements, or both using the display module 220.

The WebRTC module 230 accesses, sends, and receives data via a WebRTC connection. For example, the WebRTC module 230 may access image data from a camera, audio data from a microphone, or both. The WebRTC module 230 may encapsulate the data in a WebRTC format, and send the data over the network 130 to another client device 140 using the communication module 210. As another example, the WebRTC module 230 may receive data from another client device 140 via the communication module 210 and process the received data for presentation to a user via the display module 220, via a speaker, or both.

The storage module 240 stores the data used to implement one or more WebRTC applications or attack protection for WebRTC providers. For example, JavaScript code for the WebRTC module 230, audio or video data for transmission, audio or video data for presentation to the user, or any suitable combination thereof may be stored by the storage module 240. Code stored by the storage module 240 may be accessed by the web browser 150A for execution. In some example embodiments, the received code is executed as soon as it is received. In other example embodiments, the received code is executed at a later time.

Figure 3:
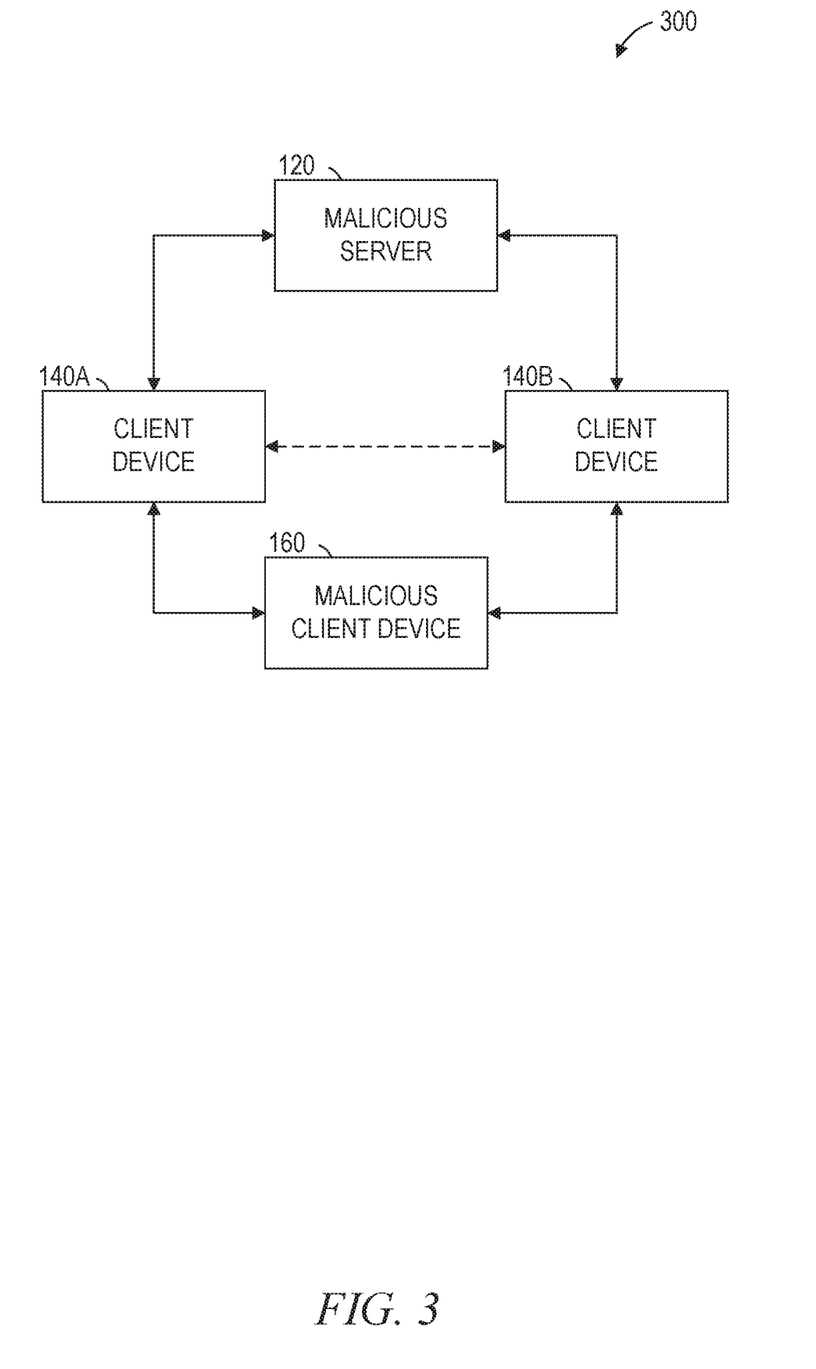
FIG. 3 is a network diagram illustrating an attack on WebRTC users, according to some example embodiments.

FIG. 3 is a network diagram 300 illustrating an attack on WebRTC users, according to some example embodiments. In the network diagram 300, the malicious server 120 has provided malicious WebRTC code to the client devices 140A and 140B. For example, the malicious server 120 may be a server intentionally accessed by the client devices 140A and 140B that, unbeknownst to the users, intends to surreptitiously monitor the WebRTC traffic between the client devices 140A and 140B. As another example, the malicious server 120 may have injected malicious code into a web page served by a server 110 (shown in FIG. 1), wherein the server 110 was intentionally accessed by the users of the client devices 140A and 140B and the malicious server 120 was not intentionally accessed. Injection of malicious code may occur, for example, when third-party advertisements are hosted on a web page.

As a result of the malicious code being executed on the client devices 140A and 140B, all WebRTC traffic is actually sent to the malicious client device 160. The malicious client device 160 then forwards the WebRTC traffic to its appropriate destination. As a result, the client devices 140A and 140B are able to proceed with their WebRTC communications without necessarily being alerted to the interception of data by the malicious client device 160. Accordingly, the dashed-line connection is shown between the client devices 140A and 140B to indicate the connection that they believe they have.

Figure 4:
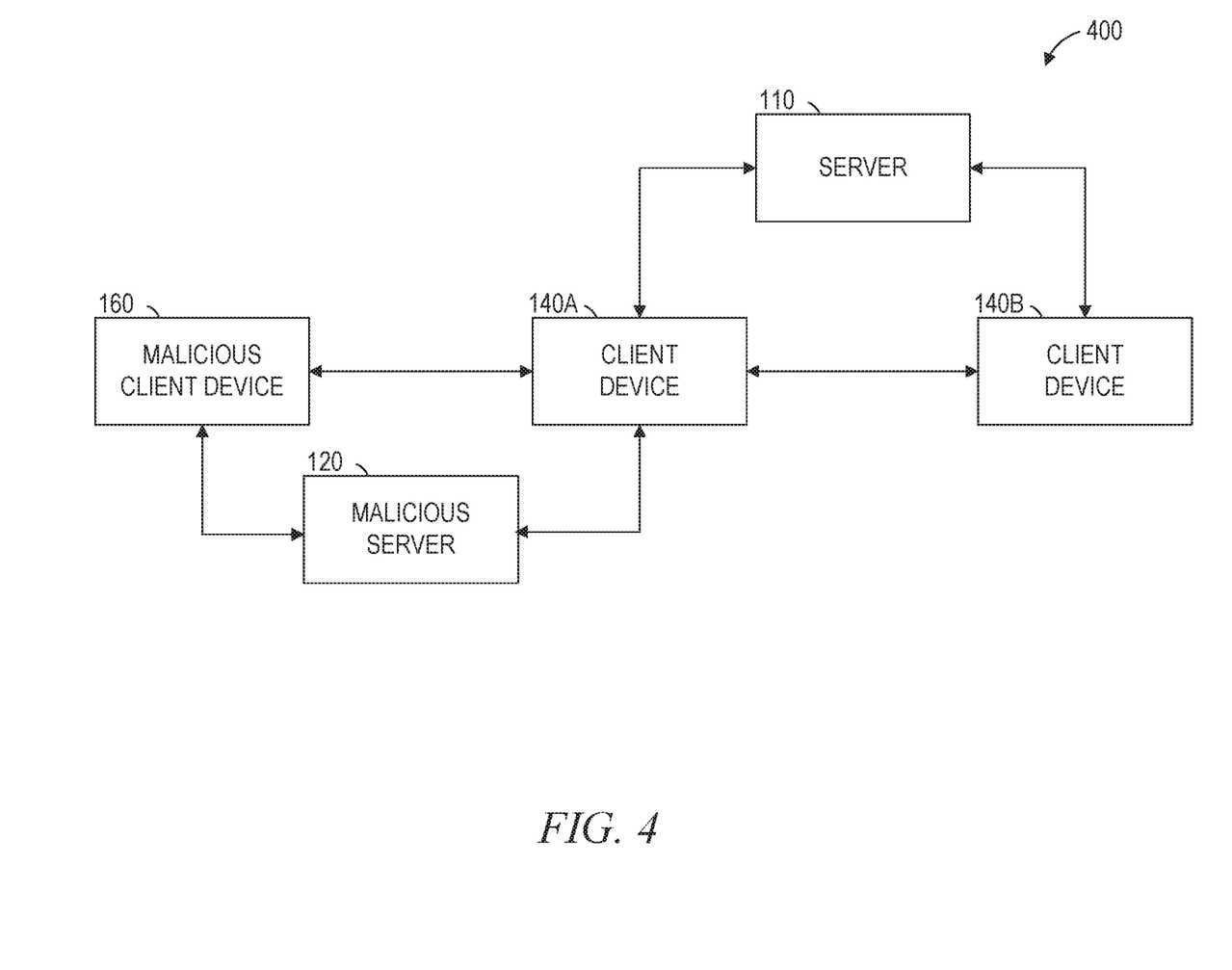
FIG. 4 is a network diagram illustrating an attack on WebRTC users, according to some example embodiments.

FIG. 4 is a network diagram 400 illustrating an attack on WebRTC users, according to some example embodiments. In the network diagram 400, the malicious server 120 has provided malicious WebRTC code to the client device 140A, and the server 110 has provided non-malicious WebRTC code to the client devices 140A and 140B. Using the non-malicious WebRTC code, the client devices 140A and 140B establish a WebRTC connection. Using the malicious WebRTC code, the client device 140A also establishes a WebRTC connection with the malicious client device 160. The malicious WebRTC code can transmit both the data generated at the client device 140A (e.g., via a camera attached to the client device 140A) and the data received at the client device 140A from the client device 140B (e.g., audio/video data streamed from the client device 140B to the client device 140A). As a result, the malicious client device 160 can monitor all traffic between the two client devices 140A-140B even though only one client device 140A is running the malicious code.

Figure 5:
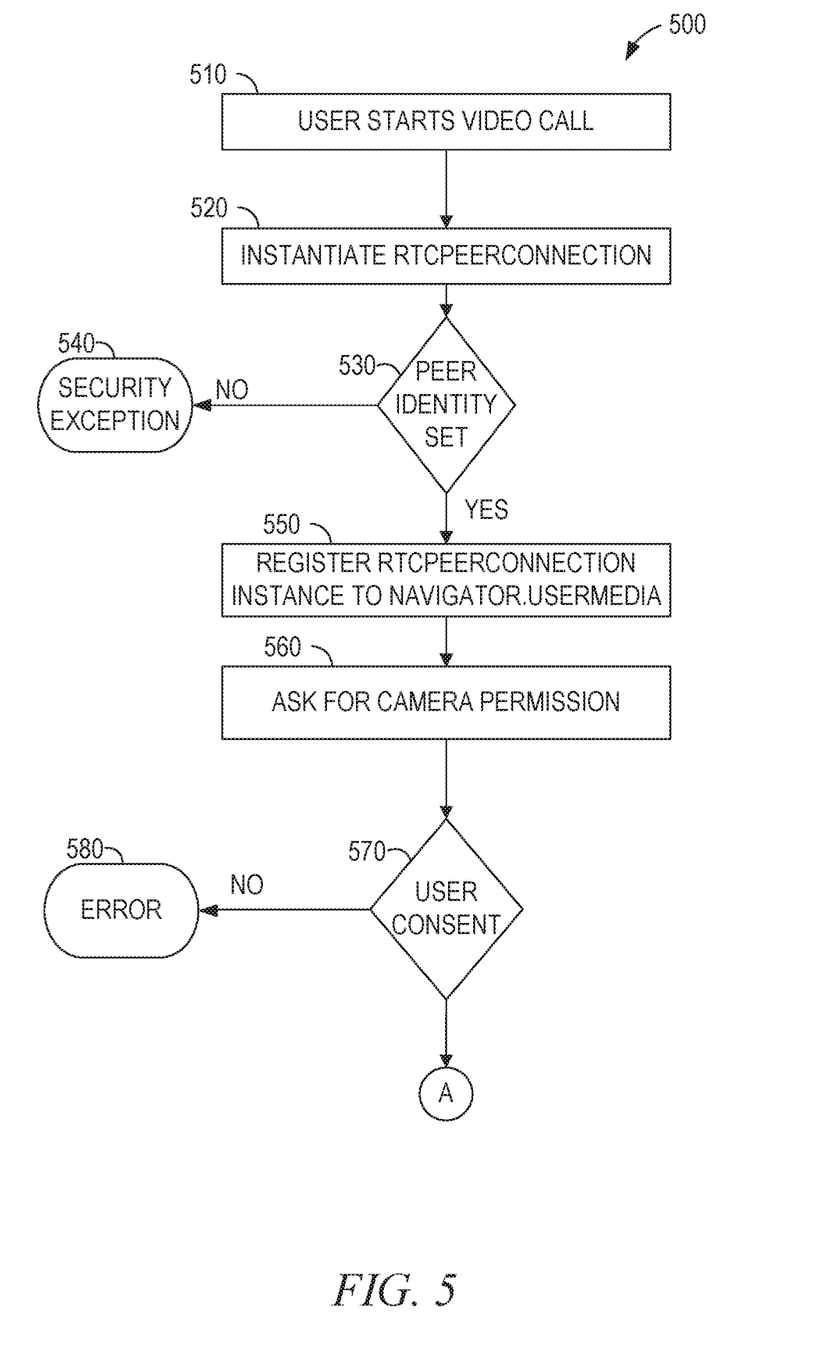
FIGS. 5-6 are a flowchart illustrating operations, according to some example embodiments, suitable for implementing attack protection for WebRTC providers.
Figure 6:
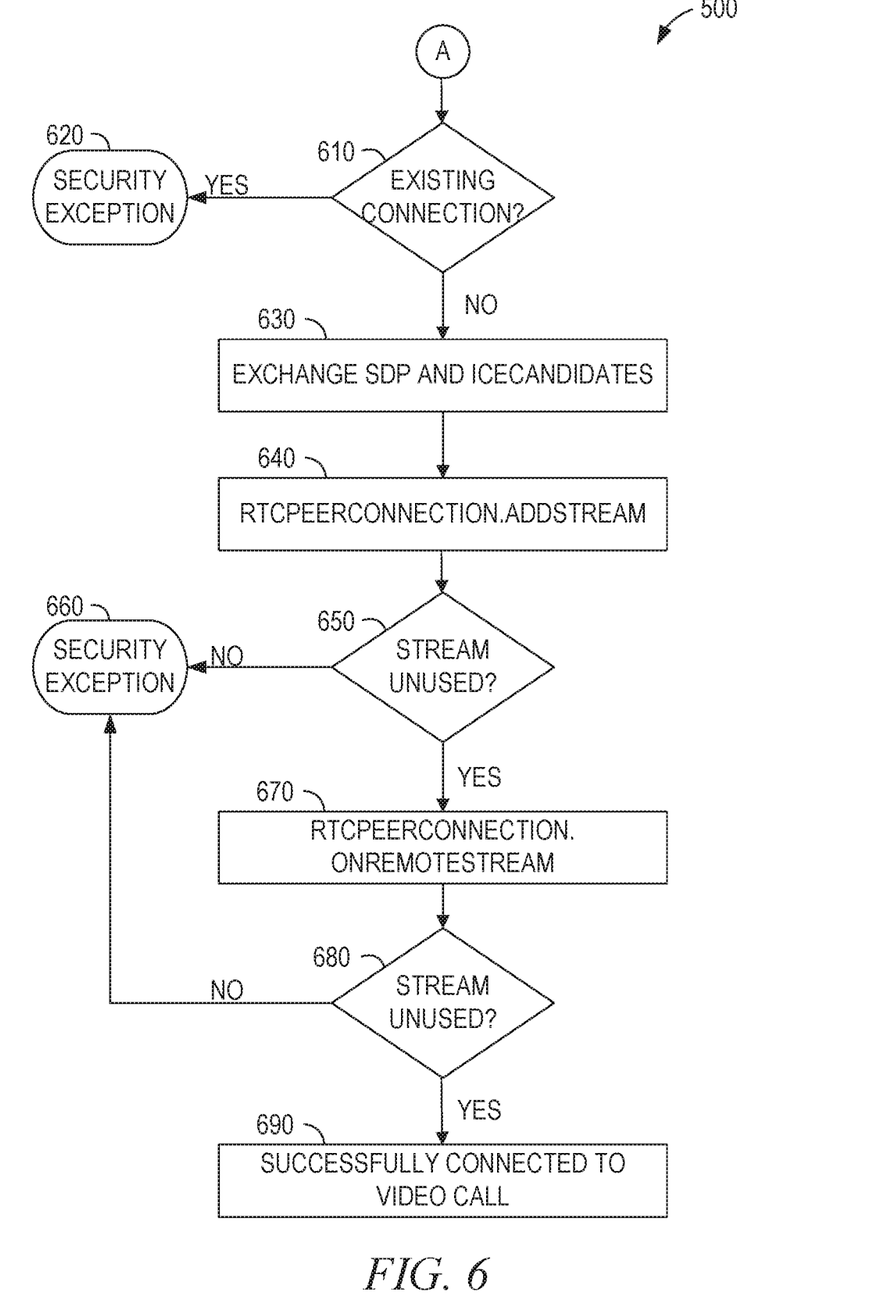

FIGS. 5-6 are a flowchart illustrating operations of a method 500, according to some example embodiments, suitable for implementing attack protection for WebRTC providers. Shown in the method 500 are the operations 510-690 described below as being performed by the devices and modules of FIGS. 1-2, by way of example and not limitation.

In operation 510, a user starts a video call. For example, a user of the web browser 150A running on the client device 140A may invoke a WebRTC application using the WebRTC module 230 to start a video call to the client device 140B. In operation 520, the WebRTC module 230 instantiates an RTCPeerConnection with the client device 140B.

The WebRTC module 230 checks, in operation 530, if the peer identity is set. This check may be termed an identity assertion of the peer. If the peer identity is not set (i.e., the identity assertion fails), a security exception is thrown in operation 540, preventing the video call from continuing with a peer identity. Peer identity may be checked through the use of an identity provider (e.g., the server 110). For example, the identity provider can verify the IP address of the clients that the server is attempting to connect. When the clients attempt to open WebRTC connections with each other, they send identifying information, such as the IP address, of the other client to which they communicate. The identity provider can verify that the destination IP address is the same as that intended by the identity provider. Thus, a malicious change to the destination IP address will be detected through the identity assertion and authentication by the identity server.

In operation 550, after confirming the peer identity, the WebRTC module 230 registers an RTCPeerConnection instance to navigator.userMedia. By registering the RTCPeerConnection to the navigator.userMedia, the WebRTC module 230 associates the particular input device with the particular peer connection. In operation 560, the navigator.userMedia JavaScript function prompts the user for permission to use a video input device or an audio input device.

If the user does not consent to the use of the input device for the video call (operation 570), this is an error condition (operation 580) and the video call is terminated. Otherwise, if there is already an existing connection for the input device (operation 610), a security exception (operation 620) is generated. For example, if a different RTCPeerConnection instance was already registered for the input device, a security exception would be thrown, preventing the data from the input device from being sent to two different peers as in FIG. 4.

In operation 630, the client devices 140A and 140B exchange metadata via a signaling server (e.g., the server 110). The metadata is used to set up the peer connection. The exchange of metadata may be handled via the exchange of session description protocol (SDP) messages and interactive connectivity establishment (ICE) candidates. In some example embodiments, the client device 140A sends an SDP offer to the client device 140B via the signaling server. This SDP bundles metadata indicating parameter preferences (e.g., supported and preferred multimedia types and codecs), initialization parameters, or network information (e.g., a certificate fingerprint, an Internet protocol (IP) address, a port, or any suitable combination thereof). The client device 140B responds to the SDP offer with an SDP answer, via the signaling server. The SDP answer contains the metadata of the remote party.

In operation 640, the WebRTC module 230 invokes RTCPeerConnection.addStream to access the authorized input device as a local source of audio or video. Before and after invoking RTCPeerConnection.onRemoteStream to connect to the stream being generated by the other client device (operation 670), the WebRTC module 230 confirms that no other use of the remote stream is being made (operations 650 and 680). If an attempt is being made to use the stream twice, a security exception is thrown in operation 660. In operation 690, the video call is successfully connected, with assurances that only one stream has been created for both the local and remote streams.

Figure 7:
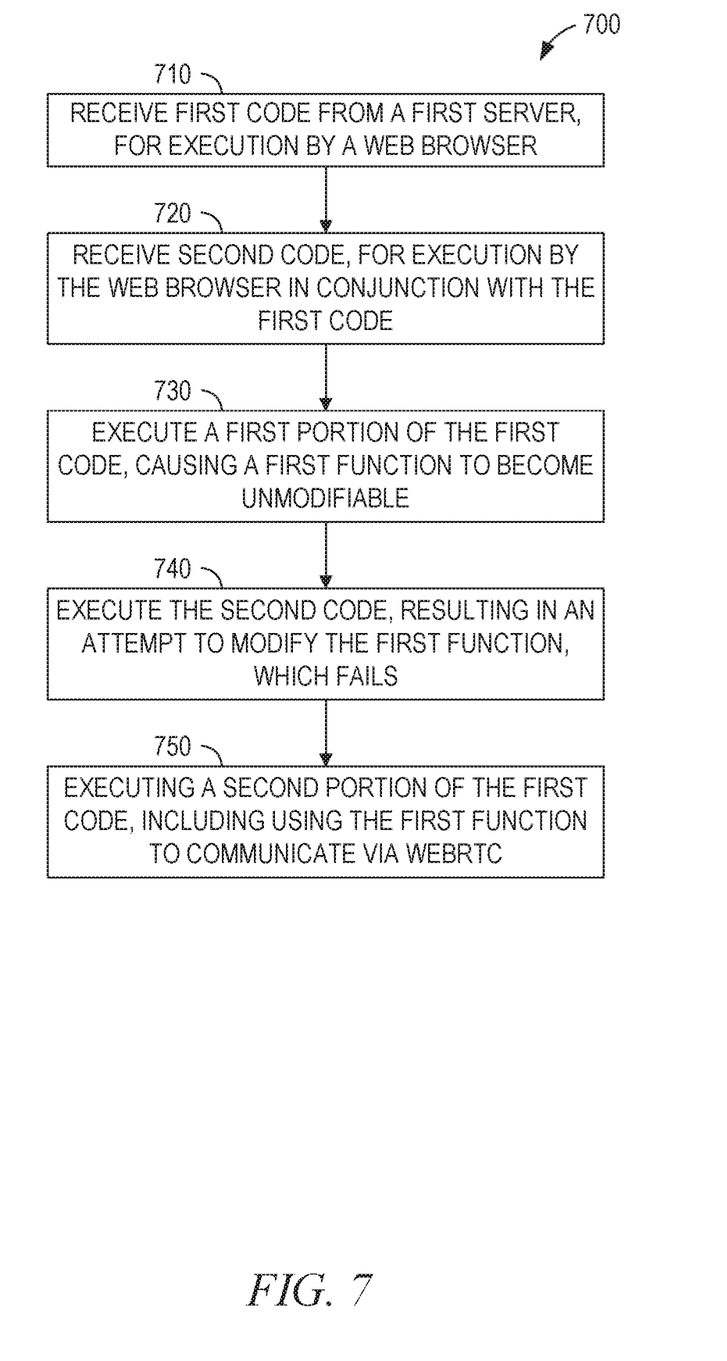
FIG. 7 is a flowchart illustrating operations, according to some example embodiments, suitable for implementing attack protection for WebRTC providers.

FIG. 7 is a flowchart illustrating operations of a method 700, according to some example embodiments, suitable for implementing attack protection for WebRTC providers. The method 700 includes the operations 710-750 described below as being performed by the devices and modules of FIGS. 1-2, by way of example and not limitation.

In operation 710, a client device (e.g., the client device 140A) receives first code from a first server (e.g., the server 110) for execution by a web browser (e.g., the web browser 150A). For example, a web page with embedded JavaScript may be downloaded by the web browser 150A of the client device 140A for presentation on a display of the client device 140A.

In operation 720, the client device receives second code (e.g., from the server 110 or from the malicious server 120) for execution by the web browser in conjunction with the first code. For example, an ad may be embedded in the web page, wherein the ad contains additional JavaScript code. The ad may be served by the server 110 or incorporated by reference into the web page and served by the malicious server 120.

The client device executes a first portion of the first code, causing a first function to become unmodifiable (operation 730). For example, since the server 110 is the primary server of the web page, a portion of the JavaScript served by the server 110 can be forced to run before any other code embedded in the web page. In standard implementations of JavaScript, code is run in the order it is presented on the page. Thus, code that is embedded in the page prior to untrusted code (e.g., portions of the page provided or served by third parties) will run prior to the untrusted code. The first portion of the code can execute the JavaScript freeze method on one or more objects, including objects that provide WebRTC functionality. For example, the first portion of the code may wrap RTCPeerConnection.addStream( ) and navigator.getUserMedia( ) to provide functionality that ensures that input devices are linked to no more than one stream and that streams are not used more than once. The wrapped code may also include calls to an identity server to authenticate the destinations of streams. Once the code is wrapped, the RTCPeerConnection and navigator objects are frozen via the Object.freeze( ) method, which prevents later-run code from undoing the protective wrapping.

In operation 740, the second code is executed, resulting in an attempt to modify the first function, which fails. For example, the second code may attempt to modify the RTCPeerConnection.addStream( ) function in a way that automatically uses any generated streams to send data to a malicious client or server. However, because the RTCPeerConnection object was frozen in operation 730, the attempt to modify the addStream( ) function in operation 740 fails and the attack is thwarted.

In operation 750, a second portion of the first code is executed, including use of the first function to communicate via WebRTC. For example, a portion of the web page that begins executing after the JavaScript code embedded in a malicious ad may establish a video call via WebRTC. Thus, by the use of the method 700, web pages can include portions that are served by untrusted third parties and provide WebRTC functionality to users without running the risk that WebRTC itself will be used to compromise the users' communications.

According to various example embodiments, one or more of the methodologies described herein may facilitate attack protection for WebRTC providers. Computing resources used by one or more machines, databases, or devices (e.g., within the network environment 100) may be reduced when compared with other methods of attack protection or resources consumed by client devices in supporting a successful attack. Examples of such computing resources include processor cycles, network traffic, memory usage, data storage capacity, power consumption, and cooling capacity.

Figure 8:
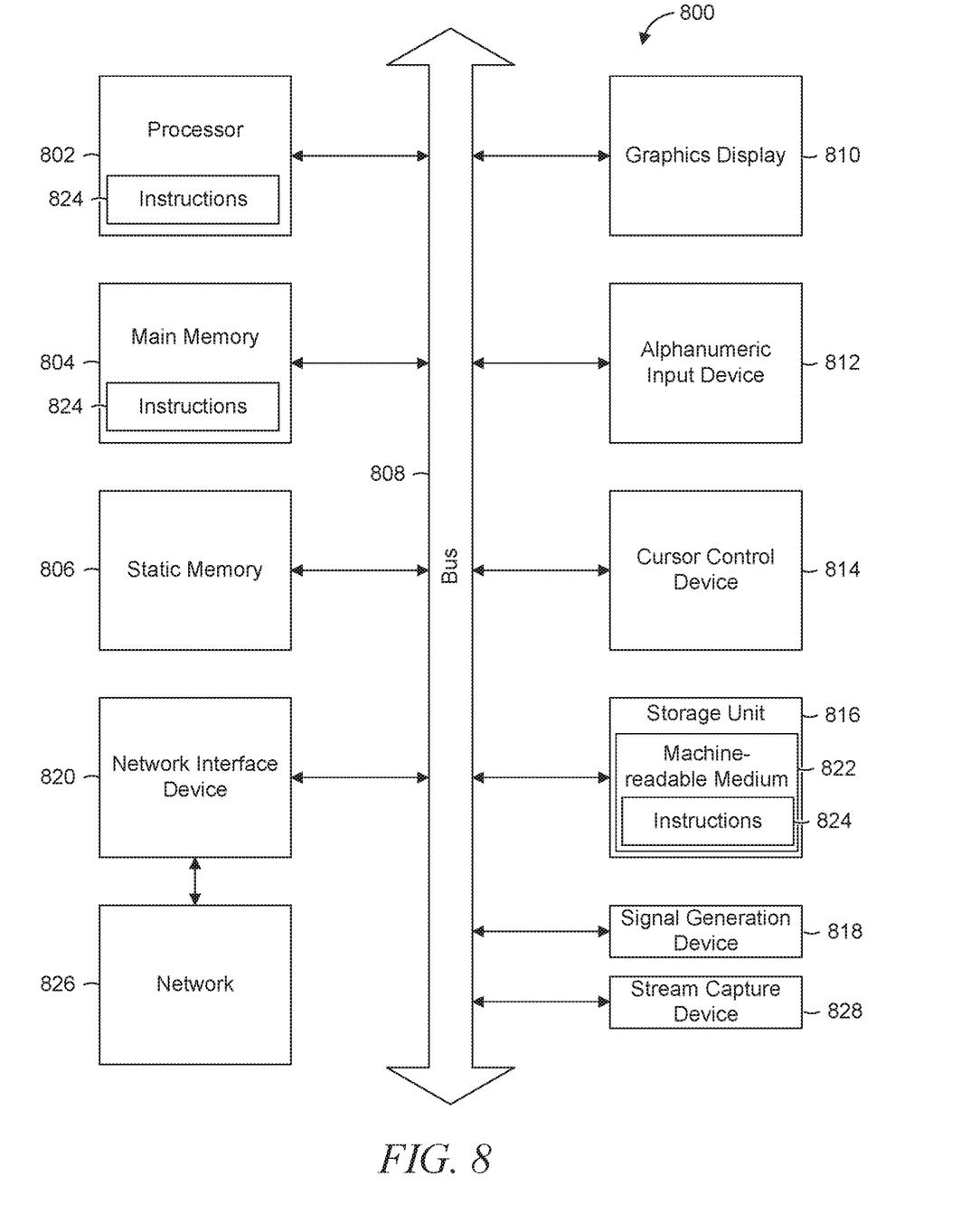
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium, a computer-readable storage medium, or any suitable combination thereof) and perform any one or more of the methodologies discussed herein, in whole or in part. As used herein, machine-readable storage media are non-transitory, in the sense that the term "machine-readable storage medium" excludes transitory signals.

FIG. 8 shows a diagrammatic representation of the machine 800 in the example form of a computer system and within which instructions 824 (e.g., software, a program, an application, an applet, an app, or other executable code) for causing the machine 800 to perform any one or more of the methodologies discussed herein may be executed, in whole or in part. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), a network interface device 820, and a stream capture device 828 (e.g., a camera that captures video data, a microphone that captures audio data, or both).

The storage unit 816 includes a machine-readable medium 822 on which is stored the instructions 824 embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820. Video or audio data captured by the stream capture device 828 may be transmitted by a WebRTC connection to another machine 800. Video or audio data received via the network interface device 820 may be presented on the graphics display 810, via the signal generation device 818, or both.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., the instructions 824) for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   a memory that stores instructions;
   one or more processors in communication with a network, configured by the instructions to perform operations comprising:
   accessing first code from a first server for execution by a web browser;
   accessing second code for execution by the web browser in conjunction with the first code;
   executing a first portion of the first code by the web browser, the first portion of the first code modifying a first function to prevent web real-time communication (WebRTC) streams from being used more than once; and
   executing the second code by the web browser after the execution of the first code, the second code attempting use a WebRTC stream that is already in use and failing due to the execution of the first portion of the first code.

2. The system of claim 1, wherein the second code is received from a second server distinct from the first server.

3. The system of claim 1, wherein:
the preventing of WebRTC streams from being used more than once prevents WebRTC streams generated at the system from being used more than once.

4. The system of claim 1, wherein:
the execution of the first portion of the first code further causes WebRTC connections to be allowed only between end-users with valid identity assertions.

5. The system of claim 1, wherein:
the execution of the first portion of the first code further causes attempts to create more than one stream for a device to fail.

6. The system of claim 1, wherein:
the execution of the first portion of the first code further causes attempts to create WebRTC connections to be authenticated by the first server.

7. The system of claim 1, wherein:
the preventing of WebRTC streams from being used more than once prevents WebRTC streams received by the system from being used more than once.

8. A method comprising:
accessing, by a client device, first code from a first server, for execution by a web browser run on one or more processors;
accessing second code, by the client device, for execution by the web browser in conjunction with the first code;
executing, by the one or more processors, a first portion of the first code by the web browser, the first portion of the first code modifying a first function to prevent web real-time communication (WebRTC) streams from being used more than once; and
executing, by the one or more processors, the second code by the web browser after the execution of the first code, the second code attempting to use a WebRTC stream that is already in use and failing due to the execution of the first portion of the first code.

9. The method of claim 8, wherein the second code is received from a second server distinct from the first server.

10. The method of claim 8, wherein:
the preventing of WebRTC streams from being used more than once prevents WebRTC streams generated at the client device from being used more than once.

11. The method of claim 8, wherein:
the execution of the first portion of the first code causes WebRTC connections to be allowed only between end-users with valid identity assertions.

12. The method of claim 8, wherein:
the execution of the first portion of the first code further causes attempts to create more than one stream for a device to fail.

13. The method of claim 8, wherein:
the execution of the first portion of the first code causes attempts to create WebRTC connections to be authenticated by the first server.

14. The method of claim 8, wherein:
the preventing of WebRTC streams from being used more than once prevents WebRTC streams received by the client device from being used more than once.

15. A non-transitory machine-readable storage medium comprising instructions that, when executed by one or more processors of a device, cause the device to perform operations comprising:
accessing first code from a first server for execution by a web browser;
accessing second code for execution by the web browser in conjunction with the first code;
executing a first portion of the first code by the web browser, the first portion of the first code modifying a first function to prevent web real-time communication (WebRTC) streams from being used more than once; and
executing the second code by the web browser after the execution of the first code, the second code attempting use a WebRTC stream that is already in use and failing due to the execution of the first portion of the first code.

16. The non-transitory machine-readable storage medium of claim 15, wherein the second code is received from a second server distinct from the first server.

17. The non-transitory machine-readable storage medium of claim 15, wherein:
the preventing of WebRTC streams from being used more than once prevents WebRTC streams generated at the device from being used more than once.

18. The non-transitory machine-readable storage medium of claim 15, wherein:
the execution of the first portion of the first code further causes WebRTC connections to be allowed only between end-users with valid identity assertions.

19. The non-transitory machine-readable storage medium of claim 15, wherein:
the execution of the first portion of the first code further causes attempts to create more than one stream for a device to fail.

20. The non-transitory machine-readable storage medium of claim 15, wherein:
the execution of the first portion of the first code further causes attempts to create WebRTC connections to be authenticated by the first server.

* * * * *